US011428569B2

(12) United States Patent
Zhang et al.

(10) Patent No.: US 11,428,569 B2
(45) Date of Patent: Aug. 30, 2022

(54) METHOD FOR DETERMINING EFFECTIVE SOUND VELOCITY IN DEEP SEA

(71) Applicant: National Deep Sea Center, Qingdao (CN)

(72) Inventors: Tongwei Zhang, Qingdao (CN); Lei Yang, Qingdao (CN); Shengjie Qin, Qingdao (CN); Xiangxin Wang, Qingdao (CN); Dequan Lu, Qingdao (CN); Jichao Yang, Qingdao (CN)

(73) Assignee: NATIONAL DEEP SEA CENTER, Qingdao (CN)

( * ) Notice: Subject to any disclaimer, the term of this patent is extended or adjusted under 35 U.S.C. 154(b) by 440 days.

(21) Appl. No.: 16/654,553

(22) Filed: Oct. 16, 2019

(65) Prior Publication Data
US 2020/0209054 A1    Jul. 2, 2020

(30) Foreign Application Priority Data
Dec. 27, 2018   (CN) .......................... 201811610665.9

(51) Int. Cl.
*H04B 11/00*   (2006.01)
*G01H 5/00*   (2006.01)
*G01S 11/14*   (2006.01)

(52) U.S. Cl.
CPC ................ *G01H 5/00* (2013.01); *G01S 11/14* (2013.01)

(58) Field of Classification Search
None
See application file for complete search history.

(56) References Cited

U.S. PATENT DOCUMENTS

| 2,683,987 A * | 7/1954 | Springer ................... G01S 1/72 356/393 |
| 2,723,556 A * | 11/1955 | Willard .................. G01N 29/07 73/597 |
| 4,229,809 A * | 10/1980 | Schwalbe ............... G01S 15/74 367/106 |
| 5,119,341 A * | 6/1992 | Youngberg ............... G01S 5/30 367/5 |
| 5,979,234 A * | 11/1999 | Karlsen ................... G01P 5/245 73/170.13 |

(Continued)

FOREIGN PATENT DOCUMENTS

| CN | 101644759 A | * | 2/2010 |
| CN | 101806884 A | * | 8/2010 |

(Continued)

*Primary Examiner* — Isam A Alsomiri
*Assistant Examiner* — Jonathan D Armstrong
(74) *Attorney, Agent, or Firm* — Tutunjian & Bitetto, P.C.

(57) ABSTRACT

The present invention discloses a method for determining an effective sound velocity in the deep sea. The method is applied to an apparatus for determining an effective sound velocity in the deep sea having a transmission point, a receiving point, and an underwater mobile carrier. The transmission point is installed on the sea surface such that the depth of the transmission point is unchanged. The receiving point is installed on the underwater mobile carrier such that the depth of the receiving point changes with movement of the underwater mobile carrier. The underwater mobile carrier can measure a sound velocity profile between the transmission point and the receiving point and a horizontal distance between the transmission point and the receiving point.

9 Claims, 3 Drawing Sheets

(56) References Cited

U.S. PATENT DOCUMENTS

| | | | |
|---|---|---|---|
| 6,208,584 B1 * | 3/2001 | Skinner | G01V 1/186 367/13 |
| 9,100,317 B1 * | 8/2015 | Xia | H04W 64/003 |
| 9,702,973 B2 * | 7/2017 | Shiba | G01H 5/00 |
| 2006/0235302 A1 * | 10/2006 | Grossman | A61B 8/08 600/443 |
| 2008/0165617 A1 * | 7/2008 | Abbot | G01S 11/14 367/3 |
| 2011/0266086 A1 * | 11/2011 | Welker | B63G 8/001 181/122 |
| 2015/0309173 A1 * | 10/2015 | Shiba | G01H 5/00 367/87 |
| 2017/0248721 A1 * | 8/2017 | Poole | G01V 1/366 |
| 2018/0113212 A1 * | 4/2018 | Tachibana | G01S 15/32 |
| 2020/0355825 A1 * | 11/2020 | Andre | G01S 15/18 |
| 2021/0231800 A1 * | 7/2021 | Jin | G01H 5/00 |

FOREIGN PATENT DOCUMENTS

| | | | | |
|---|---|---|---|---|
| CN | 101833081 | A * | 9/2010 | |
| CN | 103925904 | A * | 7/2014 | G01C 1/00 |
| CN | 206321338 | U * | 7/2017 | |
| CN | 108679459 | A * | 10/2018 | F17D 5/06 |
| GB | 2442749 | A * | 4/2008 | G01S 13/86 |
| JP | H095435 | A * | 1/1997 | |
| WO | WO-2014083790 | A1 * | 6/2014 | G01H 5/00 |
| WO | WO-2014111431 | A2 * | 7/2014 | G01V 1/282 |

\* cited by examiner

METHOD FOR DETERMINING EFFECTIVE SOUND VELOCITY IN DEEP SEA

TECHNICAL FIELD

The present invention relates to the sound velocity propagation field, and in particular, to a method for determining an effective sound velocity in the deep sea.

BACKGROUND

An underwater acoustic positioning system measures a propagation time from a transmission point to a receiving point, then converts the propagation time into a slant distance between the transmission point and the receiving point, and finally implements underwater positioning. However, due to uneven distribution of a sound velocity in a vertical direction and resulting sound ray bending, the propagation distance of a sound signal from the transmission point to the receiving point is longer than the slant distance between the transmission point and the receiving point, which has great influence on the ranging accuracy and the positioning accuracy of the underwater acoustic positioning system. Therefore, sound ray bending needs to be corrected.

One idea is to use a sound ray tracing technology. In the sound ray tracing technology, a hierarchical approximation method and a layer-by-layer calculation method are used to compensate sound ray bending, so as to improve the positioning accuracy of the underwater acoustic positioning system. However, the sound ray tracing technology needs to balance between the positioning accuracy and the calculation amount, greatly restricting actual applications.

Another idea is to use an effective sound velocity technology. An effective sound velocity $v_e$ is a ratio of a slant distance R between a transmission point and a receiving point to a propagation time $T_t$ from the transmission point and the receiving point. Correspondingly, the slant distance R between the transmission point and the receiving point is equal to a product of the propagation time $T_t$ and effective sound velocity $v_e$. The measurement accuracy of an underwater propagation time is very high, and therefore the accuracy of the slant distance R depends on the accuracy of effective sound velocity $v_e$.

Only a direct wave area (both an ultra short baseline positioning system and a long baseline positioning system work in this area) is considered. The sound velocity $v_e$ satisfies a function between a transmission point depth $z_A$, a receiving point depth $z_B$, a pitch angle $\beta$ between the transmission point depth $z_A$ and the receiving point depth $z_B$, and a sound velocity profile c(z) between the transmission point depth $z_A$ and the receiving point depth $z_B$, which is referred to a Taylor series analysis method:

$$v_e = \bar{v}(1 - C_2 J_2 - C_3 J_3 - C_4 J_4) \tag{1}$$

where $\bar{v}$ is an arithmetic mean sound velocity; $\bar{w}$ is a mean square-arithmetic mean sound velocity (used for rapid calculation); $C_2$, $C_3$, and $C_4$ are a second-order sound velocity coefficient, a third-order sound velocity coefficient, and a fourth-order sound velocity coefficient; $J_2$, $J_3$, and $J_4$ are a second-order J function, a third-order J function, and a fourth-order J function:

$$\bar{v} = \frac{1}{z_B - z_A} \int_{z_A}^{z_B} c(z) dz \tag{2a}$$

$$\bar{w} = \frac{1}{z_B - z_A} \int_{z_A}^{z_B} c^2(z) dz \tag{2b}$$

$$C_2 = 1 - \frac{1}{2}\cot^2\beta \tag{3a}$$

$$C_3 = -C_2 - \frac{1}{2}\cot^4\beta \tag{3b}$$

$$C_4 = \frac{1}{8}\cot^4\beta(3 - 5\cot^2\beta) + C_2 \tag{3c}$$

$$J_n = \frac{1}{z_B - z_A} \int_{z_A}^{z_B} \left(\frac{c(z) - \bar{v}}{\bar{v}}\right)^n dz, n = 2, 3, 4 \tag{4}$$

Therefore, information required for calculating the effective sound velocity $v_e$ by using the Taylor series analysis method is the transmission point depth $z_A$, the receiving point depth $z_B$, the pitch angle $\beta$ between the transmission point depth $z_A$ and the receiving point depth $z_B$, and the sound velocity profile c(z) between the transmission point depth $z_A$ and the receiving point depth $z_B$.

A main calculation amount of calculating the effective sound velocity $v_e$ by using the Taylor series analysis method is reflected in two integral operations, that is, Formula (2) and Formula (4). As long as the transmission point depth or the receiving point depth changes, it is necessary to recalculate corresponding $v_e$. In the deep sea, a difference between the transmission point depth and the receiving point depth is usually very large, and an actual sound velocity profile between the transmission point depth and the receiving point depth is very complex, leading to a very large main integral calculation amount of Formula (2) and Formula (4). As a result, it is difficult to satisfy an actual application requirement.

SUMMARY

An objective of the present invention is to provide a method for determining an effective sound velocity in the deep sea, so as to rapidly and accurately determine an effective sound velocity.

To achieve the above purpose, the present invention provides the following technical solution.

The present invention provides a method for determining an effective sound velocity in the deep sea, where the method is applied to an apparatus for determining an effective sound velocity in the deep sea. The apparatus includes a transmission point, a receiving point, and an underwater mobile carrier. The transmission point is installed on the sea surface and the depth of the transmission point is unchanged. The receiving point is installed on the underwater mobile carrier, and the depth of the receiving point changes with movement of the underwater mobile carrier. The underwater mobile carrier can measure a sound velocity profile between the transmission point and the receiving point and a horizontal distance between the transmission point and the receiving point.

The method includes obtaining a transmission point depth at a moment k and a receiving point depth at the moment k and obtaining a receiving point depth at a moment k+1 and the horizontal distance between the transmission point and the receiving point. A pitch angle is determined between the transmission point and the receiving point according to the transmission point depth, the receiving point depth at the moment k+1, and the horizontal distance between the transmission point and the receiving point. A sound velocity profile is obtained between the transmission point and the receiving point at the moment k+1, and a difference between the receiving point depth at the moment k and the receiving point depth at the k+1 moment is also obtained. An arithmetic average sound velocity variable quantity and a mean square arithmetic average sound velocity variable quantity are determined according to the receiving point depth at the moment k+1, the receiving point depth at the moment k, the difference between the receiving point depth at the moment k and the receiving point depth at the moment k+1, and the sound velocity profile between the transmission point and the receiving point at the moment k+1.

A depth difference between the receiving point and the transmission point at the moment k is obtained and then an arithmetic average sound velocity at the moment k+1 and a mean square average sound velocity at the moment k+1 is determined according to a depth difference between the receiving point and the transmission point at the moment k+1, the difference between the receiving point depth at the moment k and the receiving point depth at the moment k+1, an arithmetic average sound velocity at the moment k, a mean square average sound velocity at the moment k, the arithmetic average sound velocity variable quantity, and the mean square arithmetic average sound velocity variable quantity.

An n-order sound velocity function variable quantity (n=2,3,4) is determined according to the sound velocity profile between the transmission point and the receiving point at the moment k+1, the receiving point depth at the moment k, the receiving point depth at the moment k+1, and the arithmetic average sound velocity at the moment k+1.

An n-order sound velocity function (n=2,3,4) at the moment k+1 is then determined according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity;

An n-order sound velocity coefficient (n=2,3,4) at the moment k+1 is calculated according to a pitch angle at the moment k+1, and an effective sound velocity at the moment k+1 is determined according to the n-order sound velocity coefficient at the moment k+1, the n-order sound velocity function corresponding to the n-order sound velocity coefficient at the moment k+1, and the arithmetic average sound velocity at the moment k+1.

Optionally, the obtaining of the difference between the receiving point depth at the moment k and the receiving point depth at the moment k+1 includes determining the difference between the receiving point depth at the moment k and the receiving point depth at the moment k+1 according to the receiving point depth at the moment k and the receiving point depth at the moment k+1 by using a formula $\Delta z_k = z_{B,k+1} - z_{B,k}$, where $\Delta z_k$ is the difference between the receiving point depth at the moment k and the receiving point depth at the moment k+1; $z_{B,k}$ is the receiving point depth at the moment k; and $z_{B+1}$ is the receiving point depth at the moment k+1.

Optionally, the obtaining of the depth difference between the receiving point and the transmission point at the moment k includes determining the depth difference between the receiving point and the transmission point at the moment k according to the receiving point depth at the moment k and the transmission point depth at the moment k by using a formula $z_{ABk} = z_{B,k} - z_A$, where $z_{ABk}$ is the depth difference between the receiving point and the transmission point at the moment k; $z_A$ is the transmission point depth; and $z_{B,k}$ is the receiving point depth at the moment k.

Optionally, the determining an arithmetic average sound velocity variable quantity and a mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k+1 includes respectively determining the arithmetic average sound velocity variable quantity and the mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k by using a formula $\Delta V_k = \int_{z_{B,k}}^{z_{B,k}+\Delta z_k} c(z)dz$ and a formula $\Delta W_k = \int_{z_{B,k}}^{z_{B,k}+\Delta z_k} c^2(z)dz$, where $\Delta V_k$ is the arithmetic average sound velocity variable quantity; $\Delta W_k$ is the mean square arithmetic average sound velocity variable quantity; $z_{B,k}+\Delta z_k$ is the receiving point depth at the moment k+1; $z_{B,k}$ is the receiving point depth at the moment k; $\Delta z_k$ is the difference between the receiving point depth at the moment k and the receiving point depth at the moment k+1; and c(z) is the sound velocity profile between the transmission point and the receiving point at the moment k+1.

Optionally, the determining an arithmetic average sound velocity at the moment k+1 and a mean square average sound velocity at the moment k+1 according to a depth difference between the receiving point and the transmission point at the moment k+1, the difference between the receiving point depth at the moment k and the receiving point depth at the moment k+1, an arithmetic average sound velocity at the moment k, a mean square average sound velocity at the moment k, the arithmetic average sound velocity variable quantity, and the mean square arithmetic average sound velocity variable quantity includes obtaining a sound velocity profile at the moment k, determining the arithmetic average sound velocity at the moment k and the mean square average sound velocity at the moment k according to the sound velocity profile c(z) at the moment k, the transmission point depth $z_A$, and the receiving point depth $z_{B,k}$; and determining the arithmetic average sound velocity at the moment k+1 and the mean square average sound velocity at the moment k+1 according to the depth difference between the receiving point and the transmission point at the moment k+1, the difference between the receiving point depth at the moment k and the receiving point depth at the moment k+1, the arithmetic average sound velocity at the moment k, the mean square average sound velocity at the moment k, the arithmetic average sound velocity variable quantity, and the mean square arithmetic average sound velocity variable quantity by using a formula $$\bar{v}_{k+1} = \frac{1}{z_{ABk} + \Delta z_k} z[ABk)vk + \Delta Vk$$

and a formula $$\bar{w}_{k+1} = \frac{1}{z_{ABk} + \Delta z_k}[z_{ABk}\bar{w}_k + \Delta W_k],$$

where $\bar{v}_{k+1}$ is the arithmetic average sound velocity at the moment k+1; $\bar{w}_{k+1}$ is the mean square average sound velocity at the moment k+1; $z_{ABk}$ is the depth difference between the receiving point and the transmission point at the moment k+1; $\bar{v}_k$ is the arithmetic average sound velocity at the moment k; $\bar{w}_k$ is the mean square average sound velocity at the moment k; $\Delta V_k$ is the arithmetic average sound velocity variable quantity; and $\Delta W_k$ is the mean square arithmetic average sound velocity variable quantity.

Optionally, the determining an n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1 specifically includes determining the n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1 by using a formula $$Q_k = \int_{z_{B,k}}^{z_{B,k+1}}\left(\frac{c(z) - \bar{v}_{k+1}}{\bar{v}_{k+1}}\right)^n dz,$$

where $Q_k$ is the n-order sound velocity function variable quantity; c(z) is the sound velocity profile between the transmission point and the receiving point at the moment k+1; $z_{B,k}$ is the receiving point depth at the moment k; $z_{B,k+1}$ is the receiving point depth at the moment k+1; and $\bar{v}_{k+1}$ is the arithmetic average sound velocity at the moment k+1.

Optionally, the determining an n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity specifically includes determining the n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity by using a formula $$J_n^{k+1} = \frac{1}{z_{ABk} + \Delta z_k}\left[\int_{z_A}^{z_{B,k}}\left(\frac{c(z) - \bar{v}_{k+1}}{\bar{v}_{k+1}}\right)^n dz + Q_k\right],$$

where $J_n^{k+1}$ is the n-order sound velocity function corresponding to the n-order sound velocity coefficient at the moment k+1; $Q_k$ is the n-order sound velocity function variable quantity; $z_{ABk}$ is the depth difference between the receiving point and the transmission point at the moment k+1; $\Delta z_k$ is the difference between the receiving point depth at the moment k and the receiving point depth at the moment k+1; c(z) is the sound velocity profile between the transmission point and the receiving point at the moment k+1; and $\bar{v}_{k+1}$ is the arithmetic average sound velocity at the moment k+1.

Optionally, the calculating an n-order sound velocity coefficient (n=2,3,4) at the moment k+1 according to a pitch angle at the moment k+1 includes calculating a second-order sound velocity coefficient, a third-order sound velocity coefficient, and a fourth-order sound velocity coefficient according to the pitch angle at the moment k+1 by using formulas: $C_2^{k+1} = 1 - \frac{1}{2}\cot^2\beta_{k+1}$; $C_3^{k+1} = -C_2^{k+1} - \frac{1}{2}\cot^4\beta_{k+1}$; and $C_4^{k+1} = \frac{1}{2}\cot^4\beta_{k+1}(3 - 5\cot^2\beta_{k+1}) + C_2^{k+1}$, where $C_4^{k+1}J_4^{k+1}$),
where $\beta_{k+1}$ is the pitch angle at the moment k+1, and $C_2^{k+1}$, $C_3^{k+1}$, and $C_4^{k+1}$ are respectively the second-order sound velocity coefficient, the third-order sound velocity coefficient, and the fourth-order sound velocity coefficient.

Optionally, the determining an effective sound velocity at the moment k+1 according to the n-order sound velocity coefficient at the moment k+1, the n-order sound velocity function corresponding to the n-order sound velocity coefficient at the moment k+1, and the arithmetic average sound velocity at the moment k+1 includes determining the effective sound velocity at the moment k+1 according to a formula $v_e^{k+1} = \bar{v}_{k+1}(1 - C_2^{k+1}J_2^{k+1} - C_3^{k+1}J_3^{k+1} - C_4^{k+1}J_4^{k+1})$,
where $v_e^{k+1}$ is the effective sound velocity at the moment k+1, $\bar{v}_{k+1}$ is the arithmetic average sound velocity at the moment k+1, $J_2^{k+1}$, $J_3^{k+1}$, and $J_4^{k+1}$ and respectively a second-order sound velocity function, a third-order sound velocity function, and a fourth-order sound velocity function, and $C_2^{k+1}$, $C_3^{k+1}$, and $C_4^{k+1}$ are respectively the second-order sound velocity coefficient, the third-order sound velocity coefficient, and the fourth-order sound velocity coefficient.

According to specific embodiments provided in the present invention, the present invention discloses the following technical effects: The present invention provides a method for determining an effective sound velocity in the deep sea, which can convert an integral operation from original whole integral from the transmission point to the receiving point to local integral corresponding to a change of the receiving point depth, greatly reducing an integral calculation amount, so as to implement rapid calculation of t effective sound velocity in the deep sea.

BRIEF DESCRIPTION OF THE DRAWINGS

To describe the technical solutions in the embodiments of the present invention or in the prior art more clearly, the following briefly introduces the accompanying drawing required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method for determining an effective sound velocity in the deep sea, so as to rapidly and accurately determine an effective sound velocity.

To make the foregoing objective, features, and advantages of the present invention clearer and more comprehensible, the present invention is further described in detail below with reference to the accompanying drawings and specific embodiments.

Figure 1:
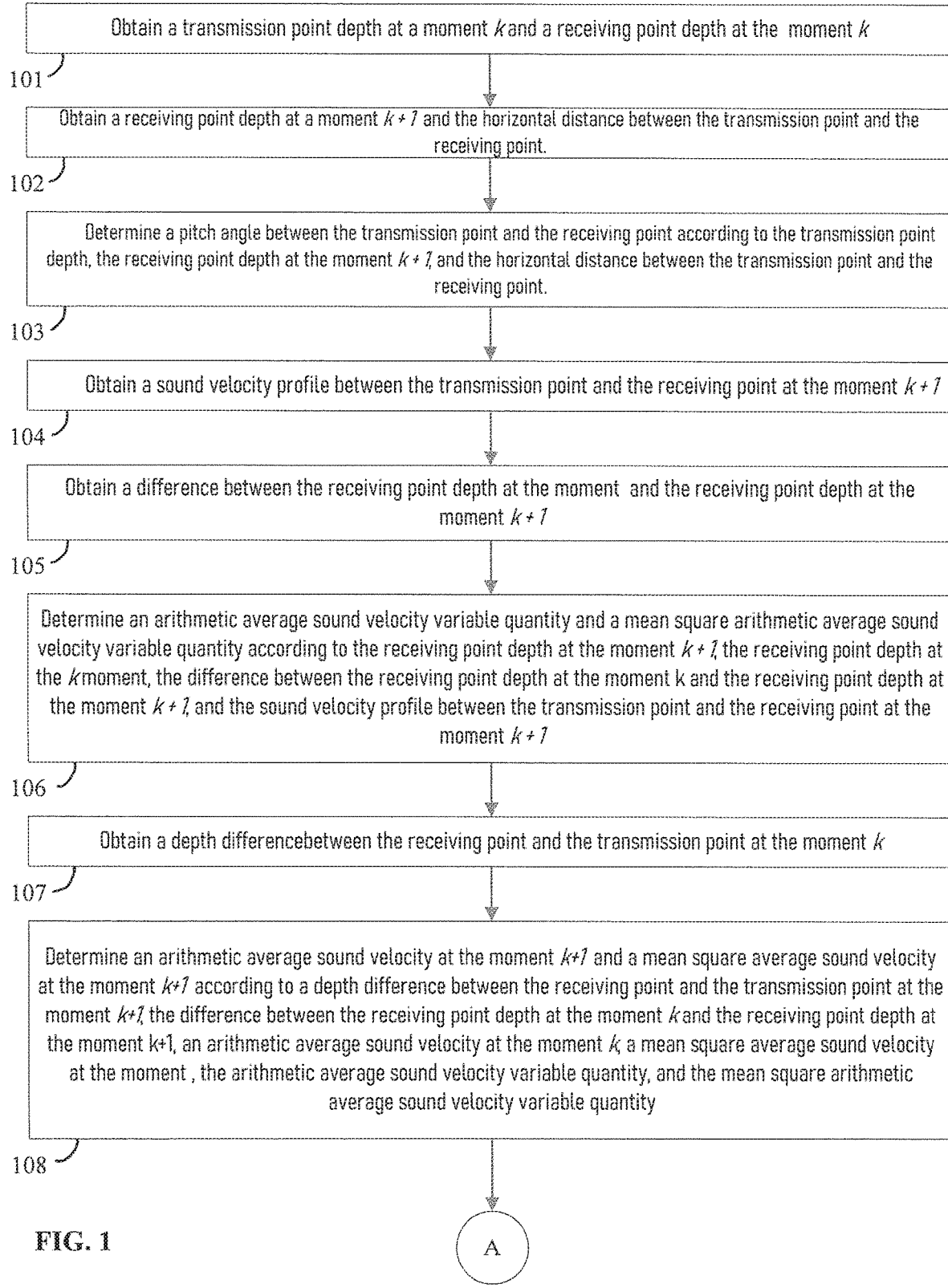
FIG. 1 is a flowchart of a method for determining an effective sound velocity in the deep sea according to an embodiment of the present invention.
Figure 1:
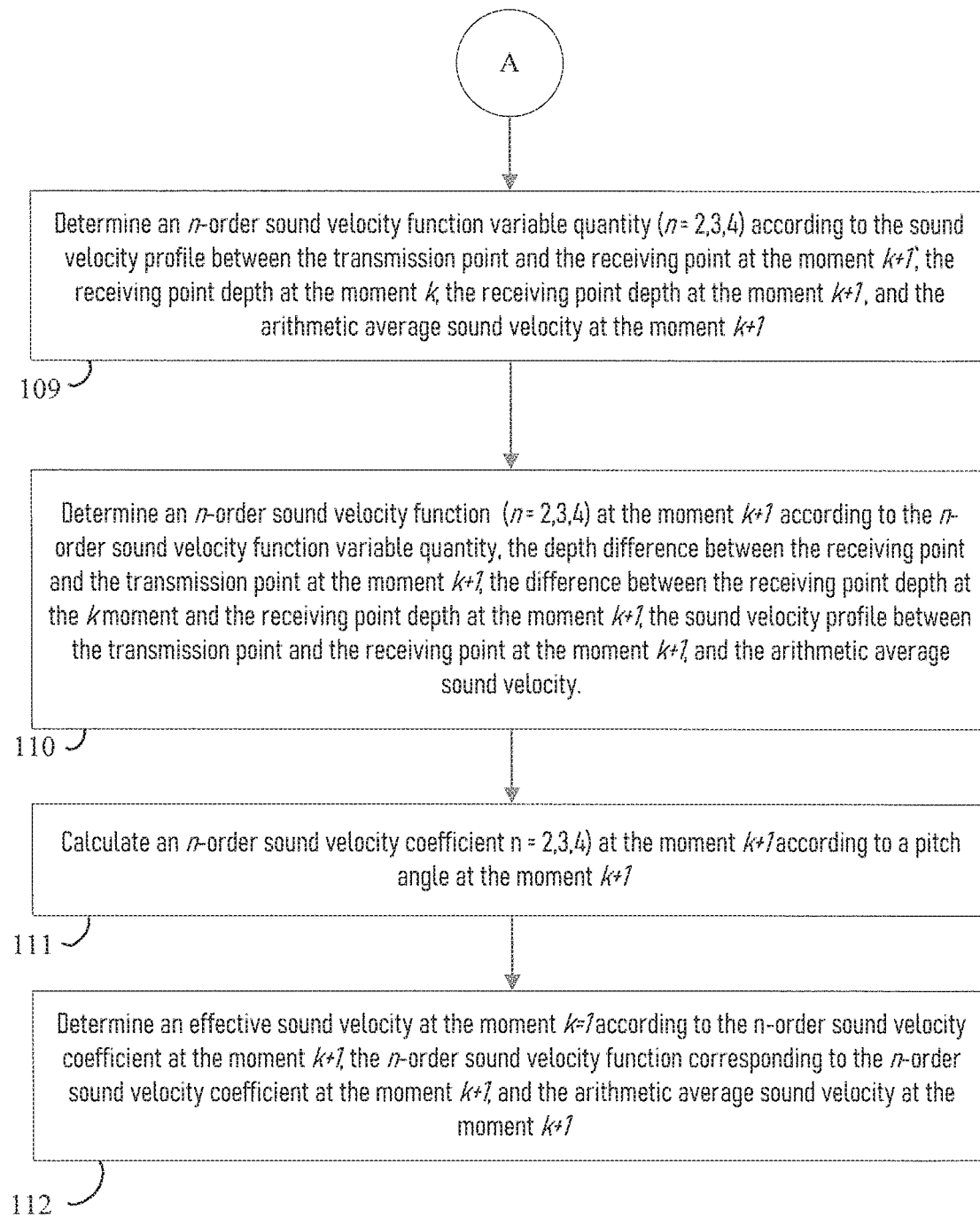
Figure 2:
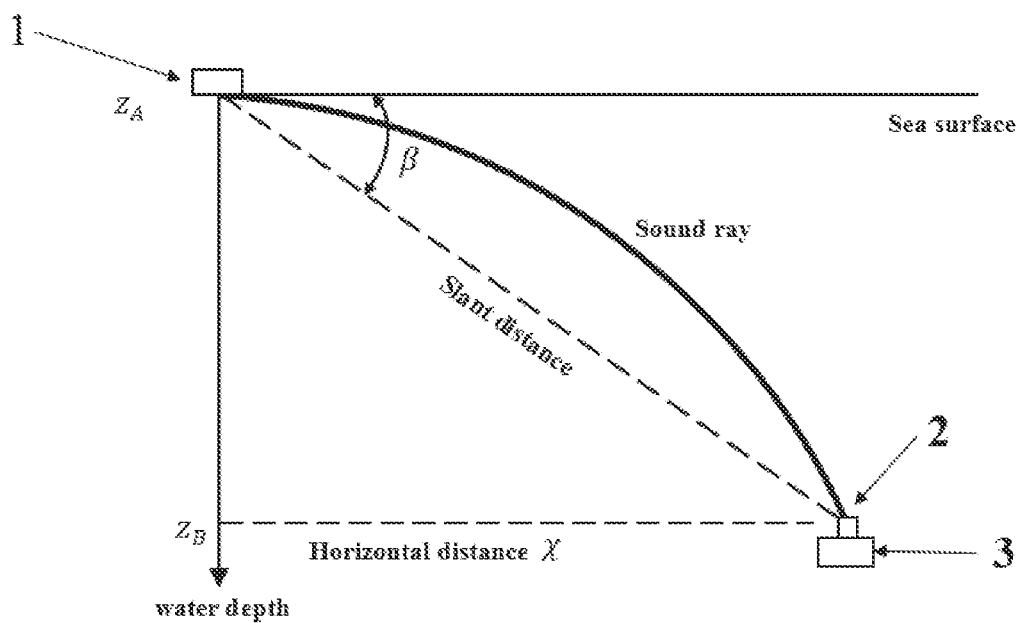
FIG. 2 is a schematic diagram of an apparatus for determining an effective sound velocity in the deep sea according to an embodiment of the present invention.

FIG. 1 is a flowchart of a method for determining an effective sound velocity in the deep sea according to an embodiment of the present invention. The method for determining an effective sound velocity in the deep sea is provided, where the method is applied to an apparatus for determining an effective sound velocity in the deep sea. As shown in FIG. 2, the apparatus includes a transmission point 1, a receiving point 2, and an underwater mobile carrier 3. The transmission point 1 is installed on the sea surface and the depth of the transmission point is unchanged. The receiving point 2 is installed on the underwater mobile carrier 3 and the depth of the receiving point changes with movement of the underwater mobile carrier 3. The underwater mobile carrier 3 can measure a sound velocity profile between the transmission point 1 and the receiving point 2 and a horizontal distance between the transmission point and the receiving point 2. As shown in FIG. 1, the method includes the following steps:

Step 101. Obtain a transmission point depth at a moment k and a receiving point depth at the k moment.

Step 102. Obtain a receiving point depth at a moment k+1 and the horizontal distance between the transmission point and the receiving point.

Step 103. Determine a pitch angle between the transmission point and the receiving point according to the transmission point depth, the receiving point depth at the moment k+1, and the horizontal distance between the transmission point and the receiving point.

Step 104. Obtain a sound velocity profile between the transmission point and the receiving point at the moment k+1.

Step 105. Obtain a difference between the receiving point depth at the moment k and the receiving point depth at the moment k+1.

Step 106. Determine an arithmetic average sound velocity variable quantity and a mean square arithmetic average sound velocity variable quantity according to the receiving point depth at the moment k+1, the receiving point depth at the k moment, the difference between the receiving point depth at the moment k and the receiving point depth at the moment k+1, and the sound velocity profile between the transmission point and the receiving point at the moment k+1.

Step 107. Obtain a depth difference between the receiving point and the transmission point at the moment k.

Step 108. Determine an arithmetic average sound velocity at the moment k+1 and a mean square average sound velocity at the moment k+1 according to a depth difference between the receiving point and the transmission point at the moment k+1, the difference between the receiving point depth at the moment k and the receiving point depth at the moment k+1, an arithmetic average sound velocity at the moment k, a mean square average sound velocity at the moment k, the arithmetic average sound velocity variable quantity, and the mean square arithmetic average sound velocity variable quantity.

Step 109. Determine an n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1.

Step 110. Determine an n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity.

Step 111. Calculate an n-order sound velocity coefficient (n=2,3,4) at the moment k+1 according to a pitch angle at the moment k+1.

Step 112. Determine an effective sound velocity at the moment k+1 according to the n-order sound velocity coefficient at the moment k+1, the n-order sound velocity function corresponding to the n-order sound velocity coefficient at the moment k+1, and the arithmetic average sound velocity at the moment k+1.

Step 105 specifically includes:

determining the difference between the receiving point depth at the moment k and the receiving point depth at the moment k+1 according to the receiving point depth at the moment k and the receiving point depth at the moment k+1 by using a formula $\Delta z_k = z_{B,k+1} - z_{B,k}$, where $66_k$ is the difference between the receiving point depth at the moment k and the receiving point depth at the moment k+1; $z_{B,k}$ is the receiving point depth at the moment k; and $z_{B,k+1}$ is the receiving point depth at the moment k+1.

Step 107 specifically includes:

determining the depth difference between the receiving point and the transmission point at the moment k according to the receiving point depth at the moment k and the transmission point depth at the moment k by using a formula $Z_{ABk} = z_{B,k} - Z_A$, where $z_{ABk}$ is the depth difference between the receiving point and the transmission point at the moment k; $z_A$ is the transmission point depth; and $z_{B,k}$ is the receiving point depth at the moment k.

Step 106 specifically includes:

respectively determining the arithmetic average sound velocity variable quantity and the mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k by using a formula $\Delta V_k = \int_{z_{B,k}}^{z_{B,k}+\Delta z_k} c(z)dz$ and a formula $\Delta W_k = \int_{z_{B,k}}^{z_{B,k}+\Delta z_k} c^2(z)dz$, where $\Delta V_k$ is the arithmetic average sound velocity variable quantity; $\Delta W_k$ is the mean square arithmetic average sound velocity variable quantity; $z_{B,k}+\Delta z_k$ is the receiving point depth at the moment k+1; $z_{B,k}$ is the receiving point depth at the moment k; $\Delta z_k$ is the difference between the receiving point depth at the moment k and the receiving point depth at the moment k+1; and c(z) is the sound velocity profile between the transmission point and the receiving point at the moment k+1.

Step 108 specifically includes:

obtaining a sound velocity profile at the moment k;

determining the arithmetic average sound velocity at the moment k and the mean square average sound velocity at the moment k according to the sound velocity profile c(z) at the moment k, the transmission point depth $z_A$, and the receiving point depth $z_{B,k}$; and determining the arithmetic average sound velocity at the moment k+1 and the mean square average sound velocity at the moment k+1 according to the depth difference between the receiving point and the transmission point at the moment k+1, the difference between the receiving point depth at the moment k and the receiving point depth at the moment k+1, the arithmetic average sound velocity at the moment k, the mean square average sound velocity at the moment k, the arithmetic average sound velocity variable quantity, and the mean square arithmetic average sound velocity variable quantity by using a formula $$\bar{v}_{k+1} = \frac{1}{z_{ABk} + \Delta z_k} z[ABk)vk + \Delta Vk$$

and a formula $$\bar{w}_{k+1} = \frac{1}{z_{ABk} + \Delta z_k} [z_{ABk}\bar{w}_k + \Delta W_k],$$

where $\bar{v}_{k+1}$ is the arithmetic average sound velocity at the moment k+1; $\bar{w}_{k+1}$ is the mean square average sound velocity at the moment k+1; $z_{ABk}$ is the depth difference between the receiving point and the transmission point at the moment k+1; $\bar{v}_k$ is the arithmetic average sound velocity at the moment k; $\bar{w}_k$ is the mean square average sound velocity at the moment k; $\Delta V_k$ is the arithmetic average sound velocity variable quantity; and $\Delta W_k$ is the mean square arithmetic average sound velocity variable quantity.

Step 109 specifically includes:

determining the n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1 by using a formula $$Q_k = \int_{z_{B,k}}^{z_{B,k+1}} \left( \frac{c(z) - \bar{v}_{k+1}}{\bar{v}_{k+1}} \right)^n dz,$$

where $Q_k$ is the n-order sound velocity function variable quantity; c(z) is the sound velocity profile between the transmission point and the receiving point at the moment k+1; $z_{B,k}$ is the receiving point depth at the moment k; $z_{B,k+1}$ is the receiving point depth at the moment k+1; and $\bar{v}_{k+1}$ is the arithmetic average sound velocity at the moment k+1.

Step 110 specifically includes:

determining the n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity by using a formula $$J_n^{k+1} = \frac{1}{z_{ABk} + \Delta z_k} \left[ \int_{z_A}^{z_{B,k}} \left( \frac{c(z) - \bar{v}_{k+1}}{\bar{v}_{k+1}} \right)^n dz + Q_k \right],$$

where $J_n^{k+1}$ is the n-order sound velocity function corresponding to the n-order sound velocity coefficient at the moment k+1; $Q_k$ is the n-order sound velocity function variable quantity; $z_{\Delta Bk}$ is the depth difference between the receiving point and the transmission point at the moment k+1; $\Delta z_k$ is the difference between the receiving point depth at the moment k and the receiving point depth at the moment k+1; c(z) is the sound velocity profile between the transmission point and the receiving point at the moment k+1; and $\bar{v}_{k+1}$ is the arithmetic average sound velocity at the moment k+1.

Step 111 specifically includes:

calculating a second-order velocity coefficient, a third-order sound velocity coefficient, and a fourth-order sound velocity coefficient according to the pitch angle at the moment k+1 by using formulas: $C_2^{k+1}=1-\frac{1}{2}\cot^2\beta_{k+1}$; $C_3^{k+1}=-C_2^{k+1}=\frac{1}{2}\cot^4\beta_{k+1}$; and $C_4^{k+1}=\frac{1}{8}\cot^4\beta_{k+1}(3-5\cot^2\beta_{k+1})+C_2^{k+1}$, where $\beta_{k+1}$ is the pitch angle at the moment k+1, $C_2^{k+1}$, $C_3^{k+1}$, and $C_4^{k+1}$, are respectively the second-order sound velocity coefficient, the third-order sound velocity coefficient, and the fourth-order sound velocity coefficient.

Step 112 specifically includes:

determining the effective sound velocity at the moment k+1 according to a formula $v_e^{k+1} = \bar{v}_{k+1}(1-C_2^{k+1}J_2^{k+1}-C_3^{k+1}J_3^{k+1}-C_4^{k+1}J_4^{k+1})$, where $v_e^{k+1}$ is the effective sound velocity at the moment k+1; $\bar{v}_{k+1}$, is arithmetic average sound velocity at the moment k+1; $J_2^{k+1}$, $J_3^{k+1}$, and $J_4^{k+1}$ are respectively a second-order sound velocity function, a third-order sound velocity function, and a fourth-order sound velocity function, and $C_2^{k+1}$, $C_3^{k+1}$, and $C_4^{k+1}$ are respectively the second-order sound velocity coefficient, the third-order sound velocity coefficient, and the fourth-order sound velocity coefficient.

Integral operations of Formula (2) and Formula (4) are converted from whole integral to local integral in a depth change area, to reduce an integral calculation amount of Formula (2) and Formula (4), so as to reduce a calculation amount of the effective sound velocity $v_e$. Only in this way, in an underwater acoustic positioning system, when a depth of the transmission point or the receiving point changes, a corresponding effective sound velocity $v_e$ can be calculated very rapidly, and then a measured propagation time is converted into a slant distance between the transmission point and the receiving point, and finally implements real-time underwater positioning.

In the present invention, it is assumed that a position of a sound source is near a sea surface and is stationary; a position of a receiving point is below the position of the sound source and the position can be moved; when both the sound source and the receiving point change, a specific method of the present invention is obtained through the following derivation method.

(1) Calculate an arithmetic average sound velocity $\bar{v}_{k+1}$ at the moment k+1 through the arithmetic average sound velocity $\bar{v}_k$ at the moment k.

From the moment k to the moment k+1, the corresponding depth difference $\Delta z_k$ of the receiving point is as follows:

$$\Delta z_k = z_{B,k+1} - z_{B,k} \qquad (5)$$

The corresponding depth difference $z_{ABk}$ between the receiving point and the transmission point at the moment k is as follows:

$$z_{ABk} = z_{B,k} - z_A \qquad (6)$$

The following formulas can be obtained through Formula (2a), Formula (2b), and Formula (6):

$$\int_{z_A}^{z_{B,k}} c(z) dz = z_{ABk} \bar{v}_k \qquad (7a)$$

$$\int_{z_A}^{z_{B,k}} c^2(z) dz = z_{ABk} \bar{w}_k \qquad (7b)$$

At the moment k+1, the arithmetic average sound velocity $\bar{v}_{k+1}$, and the mean square arithmetic average sound velocity $\Delta \bar{w}_{k+1}$ are respectively as follows:

$$\bar{v}_{k+1} = \frac{1}{z_{B,k+1} - z_A} \int_{z_A}^{z_{B,k+1}} c(z) dz = \frac{1}{z_{ABk} + \Delta z_k} \left[ z_{ABk} \bar{v}_k + \int_{z_{B,k}}^{z_{B,k}+\Delta z_k} c(z) dz \right] \qquad (8a)$$

$$\bar{w}_{k+1} = \frac{1}{z_{B,k+1} - z_A} \int_{z_A}^{z_{B,k+1}} c^2(z) dz = \frac{1}{z_{ABk} + \Delta z_k} \left[ z_{ABk} \bar{w}_k + \int_{z_{B,k}}^{z_{B,k}+\Delta z_k} c^2(z) dz \right] \qquad (8b)$$

For the receiving point, from the moment k to the moment k+1, let the arithmetic average sound velocity variable quantity $\Delta V_k$ and the mean square arithmetic average sound velocity variable quantity $\Delta W_k$ respectively satisfy the following:

$$\Delta V_k = \int_{z_{B,k}}^{z_{B,k}+\Delta z_k} c(z) dz \qquad (9a)$$

$$\Delta W_k = \int_{z_{B,k}}^{z_{B,k}+\Delta z_k} c^2(z) dz \qquad (9b)$$

In this way, Formula (8) changes to $$\bar{v}_{k+1} = \frac{1}{z_{ABk} + \Delta z_k} [z_{ABk} \bar{v}_k + \Delta V_k] \qquad (10a)$$

$$\bar{w}_{k+1} = \frac{1}{z_{ABk} + \Delta z_k} [z_{ABk} \bar{w}_k + \Delta W_k] \qquad (10b)$$

In this case, an integral operation of Formula (2) is converted from original whole integral of the transmission point to the receiving point to local integral corresponding to a change of the receiving point depth, greatly reducing an integral calculation amount.

(2) Calculate $J_n^k$ (n=2,3,4) at the moment k+1 through $J_n^k$ (n=2,3,4) at the moment k.

The following formula can be obtained through Formula (4) and Formula (7):

$$\int_{z_A}^{z_{B,k}} \left( \frac{c(z) - \bar{v}_k}{\bar{v}_k} \right)^n dz = (z_{B,k} - z_A) J_n^k = z_{ABk} J_n^k, n = 2, 3, 4 \qquad (11)$$

At the moment k+1, an n-order J function $J_n^{k+1}$ (n=2,3,4) is as follows:

$$J_n^{k+1} = \frac{1}{z_{B,k+1} - z_A} \int_{z_A}^{z_{B,k+1}} \left( \frac{c(z) - \bar{v}_{k+1}}{\bar{v}_{k+1}} \right)^n dz \qquad (12)$$

$$= \frac{1}{z_{ABk} + \Delta z_k} \left[ \int_{z_A}^{z_{B,k}} \left( \frac{c(z) - \bar{v}_{k+1}}{\bar{v}_{k+1}} \right)^n dz + \int_{z_{B,k}}^{z_{B,k+1}} \left( \frac{c(z) - \bar{v}_{k+1}}{\bar{v}_{k+1}} \right)^n dz \right]$$

For the receiving point, from the moment k to the moment k+1, let an n-order J function variable quantity $Q_k$ satisfy the following:

$$Q_k = \int_{z_{B,k}}^{z_{B,k+1}} \left( \frac{c(z) - \bar{v}_{k+1}}{\bar{v}_{k+1}} \right)^n dz, n = 2, 3, 4 \qquad (13)$$

In this case, Formula (12) changes to:

$$J_n^{k+1} = \frac{1}{z_{ABk} + \Delta z_k} \left[ \int_{z_A}^{z_{B,k}} \left( \frac{c(z) - \bar{v}_{k+1}}{\bar{v}_{k+1}} \right)^n dz + Q_k \right], n = 2, 3, 4 \qquad (14)$$

A function $f(\bar{v}_k)$ is defined as follows:

$$f(\bar{v}_k) = \left( \frac{c(z) - \bar{v}_k}{\bar{v}_k} \right)^n, n = 2, 3, 4 \qquad (15)$$

A integral of the function $f(\bar{v}_k)$ is as follows:

$$f'(\bar{v}_k) = \frac{n}{\bar{v}_k^2} c(z) - \frac{n}{\bar{v}_k^3} c^2(z) \qquad (16a)$$

$$f''(\bar{v}_k) = -\frac{2n}{\bar{v}_k^3} c(z) + \frac{3n}{\bar{v}_k^4} c^2(z) \qquad (16b)$$

$$f'''(\bar{v}_k) = \frac{6n}{\bar{v}_k^4} c(z) - \frac{12n}{\bar{v}_k^5} c^2(z) \qquad (16c)$$

$$f^{(4)}(\bar{v}_k) = -\frac{24n}{\bar{v}_k^5} c(z) + \frac{60n}{\bar{v}_k^6} c^2(z) \qquad (16d)$$

According to the Taylor expansion, a function $f(\bar{v}_{k+1})$ at the moment k+1 is as follows:

$$f(\bar{v}_{k+1}) \approx f(\bar{v}_k) + f'(\bar{v}_k) \cdot \Delta \bar{v} + \frac{1}{2} f''(\bar{v}_k) \cdot \Delta \bar{v}^2 + \frac{1}{6} f'''(\bar{v}_k) \cdot \Delta \bar{v}^3 + \frac{1}{24} f^{(4)}(\bar{v}_k) \cdot \Delta \bar{v}^4 \qquad (17)$$

$$\Delta \bar{v}_k = \bar{v}_{k+1} - \bar{v}_k \qquad (18)$$

Substitute Formula (16a-d) is substituted into Formula (17) to conduct a series of algebraic operations, and the function $f(\bar{v}_{k+1})$ at the moment k+1 may be simplified to:

$$f(\bar{v}_{k+1}) \approx f(\bar{v}_k) + \qquad (19)$$
$$\left(\frac{1}{1} \cdot \frac{n \cdot \Delta \bar{v}}{\bar{v}_k^2} - \frac{1}{2} \cdot \frac{2n - \Delta \bar{v}^2}{\bar{v}_k^3} + \frac{1}{6} \cdot \frac{6n \cdot \Delta \bar{v}^3}{\bar{v}_k^4} - \frac{1}{24} \cdot \frac{24n \cdot \Delta \bar{v}^4}{\bar{v}_k^5}\right) c(z) +$$
$$\left(-\frac{1}{1} \cdot \frac{n \cdot \Delta \bar{v}}{\bar{v}_k^3} + \frac{1}{2} \cdot \frac{3n - \Delta \bar{v}^2}{\bar{v}_k^4} - \frac{1}{6} \cdot \frac{12n \cdot \Delta \bar{v}^3}{\bar{v}_k^5} + \frac{1}{24} \cdot \frac{60n \cdot \Delta \bar{v}^4}{\bar{v}_k^6}\right) c^2(z)$$

To further simplify Formula (19), let $$\Phi_k = \frac{1}{1} \cdot \frac{n \cdot \Delta \bar{v}}{\bar{v}_k^2} - \frac{1}{2} \cdot \frac{2n - \Delta \bar{v}^2}{\bar{v}_k^3} + \frac{1}{6} \cdot \frac{6n \cdot \Delta \bar{v}^3}{\bar{v}_k^4} - \frac{1}{24} \cdot \frac{24n \cdot \Delta \bar{v}^4}{\bar{v}_k^5} \qquad (20)$$

$$\Psi_k = -\frac{1}{1} \cdot \frac{n \cdot \Delta \bar{v}}{\bar{v}_k^3} + \frac{1}{2} \cdot \frac{3n - \Delta \bar{v}^2}{\bar{v}_k^4} - \frac{1}{6} \cdot \frac{12n \cdot \Delta \bar{v}^3}{\bar{v}_k^5} + \frac{1}{24} \cdot \frac{60n \cdot \Delta \bar{v}^4}{\bar{v}_k^6} \qquad (21)$$

In this case, a function $f(\bar{v}_{k+1})$ at the moment k+1 is as follows:

$$f(\bar{v}_{k+1}) \approx f(\bar{v}_k) + \Phi_k \cdot c(z) + \Psi_k \cdot c^2(z) \qquad (22)$$

Formula (22) is substituted into Formula (12), and the n-order J function $J_n^{k+1}$ (n=2,3,4) at the moment k+1 is as follows:

$$J_n^{k+1} = \frac{1}{z_{ABk} + \Delta z_k}\left[\int_{z_A}^{z_{B,k}} f(\bar{v}_{k+1}) dz + Q_k\right] \qquad (23)$$
$$= \frac{1}{z_{ABk} + \Delta z_k}\left[\int_{z_A}^{z_{B,k}} f(\bar{v}_k) dz + \int_{z_A}^{z_{B,k}} \Phi_k \cdot c(z) dz + \int_{z_A}^{z_{B,k}} \Psi_k \cdot c^2(z) dz + Q_k\right]$$
$$= \frac{1}{z_{ABk} + \Delta z_k} \int_{z_A}^{z_{B,k}} f(\bar{v}_k) dz + \frac{\Phi_k}{z_{ABk} + \Delta z_k} \int_{z_A}^{z_{B,k}} c(z) dz +$$
$$\frac{\Psi_k}{z_{ABk} + \Delta z_k} \int_{z_A}^{z_{B,k}} c^2(z) dz + \frac{1}{z_{ABk} + \Delta z_k} Q_k$$

$J_n^{k+1}$ Formula (7) and Formula (11) are substituted into Formula (23), and the n-order J function $J_n^{k+1}$ (n=2,3,4) at the moment k+1 is as follows:

$$J_n^{k+1} = \frac{1}{z_{ABk} + \Delta z_k}[z_{ABk} J_n^k + \Phi_k Z_{ABk} \bar{v}_k + \Psi_k z_{ABk} \bar{w}_k + Q_k], n = 2, 3, 4 \qquad (24)$$

In this case, an integral operation of Formula (4) is converted from original whole integral of the transmission point to the receiving point to local integral of Formula (13) corresponding to a change of the receiving point depth, greatly reducing an integral calculation amount.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A method for determining an effective sound velocity in the deep sea, comprising:
a transmission point depth at a moment k and a receiving point depth at the moment k; wherein the transmission point is installed on the sea surface, a depth of the transmission point is unchanged, the receiving point is installed on an underwater mobile carrier, a depth of the receiving point changes with movement of the underwater mobile carrier, the underwater mobile carrier measures a sound velocity between the transmission point and the receiving point;
receiving a receiving point depth at a moment k+1 and measuring a horizontal distance between the transmission point and the receiving point by the underwater mobile carrier;
determining a pitch angle between the transmission point and the receiving point according to the transmission point depth, the receiving point depth at the moment k+1, and the horizontal distance between the transmission point and the receiving point by means of trigonometry;
obtaining a sound velocity profile between the transmission point and the receiving point at the moment k+1;
obtaining a difference between the receiving point depth at the moment k and the receiving point depth at the k+1 moment;
determining an arithmetic average sound velocity variable quantity and a mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k+1;
obtaining a depth difference between the receiving point and the transmission point at the moment k;
determining an arithmetic average sound velocity at the moment k+1 and a mean square average sound velocity at the moment k+1 according to a depth difference between the receiving point and the transmission point at the moment k+1, the difference between the receiving point depth at the moment k and the receiving point depth at the moment k+1, an arithmetic average sound velocity at the moment k, a mean square average sound velocity at the moment k, the arithmetic average sound velocity variable quantity, and the mean square arithmetic average sound velocity variable quantity;
determining an n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1;
determining an n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity;

calculating an n-order sound velocity coefficient (n=2,3,4) at the moment k+1 according to a pitch angle at the moment k+1; and determining an effective sound velocity at the moment k+1 according to the n-order sound velocity coefficient at the moment k+1, the n-order sound velocity function corresponding to the n-order sound velocity coefficient at the moment k+1, and the arithmetic average sound velocity at the moment k+1.

2. The method for determining an effective sound velocity in the deep sea according to claim 1, wherein the obtaining a difference between the receiving point depth at the moment k and the receiving point depth at the moment k+1 comprises:

determining the difference between the receiving point depth at the moment k and the receiving point depth at the moment k according to the receiving point depth at the moment k and the receiving point depth at the moment k+1 by using a formula $\Delta z_k = z_{B,k+1} - z_{B,k}$, wherein $\Delta z_k$ is the difference between the receiving point depth at the moment k and the receiving point depth at the moment k+1; $z_{B,k}$ is the receiving point depth at the moment k; and $z_{B,k+1}$ is the receiving point depth at the moment k+1.

3. The method for determining an effective sound velocity in the deep sea according to claim 2, wherein the obtaining a depth difference between the receiving point and the transmission point at the moment k comprises:

determining the depth difference between the receiving point and the transmission point at the moment k according to the receiving point depth at the moment k and the transmission point depth at the moment k by using a formula $z_{ABk} = z_{B,k} - z_A$, wherein $z_{ABk}$ is the depth difference between the receiving point and the transmission point at the moment k; $z_A$ is the transmission point depth; and $z_{B,k}$ is the receiving point depth at the moment k.

4. The method for determining an effective sound velocity in the deep sea according to claim 3, wherein the determining an arithmetic average sound velocity variable quantity and a mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k+1 comprises:

respectively determining the arithmetic average sound velocity variable quantity and the mean square arithmetic average sound velocity variable quantity according to the receiving point depth at the moment k+1, the receiving point depth at the moment k, the difference between the receiving point depth at the moment k and the receiving point depth at the moment k+1, and the sound velocity profile between the transmission point and the receiving point at the moment k by using a formula $\Delta V_k = \int_{z_{B,k}}^{z_{B,k}+\Delta z_k} c(z) dz$ and a formula $\Delta W_k = \int_{z_{B,k}}^{z_{B,k}+\Delta z_k} c^2(z) dz$, wherein $\Delta V_k$ is the arithmetic average sound velocity variable quantity; $\Delta W_k$ is the mean square arithmetic average sound velocity variable quantity; $z_{B,k}+\Delta z_k$ is the receiving point depth at the moment k+1; $z_{B,k}$ is the receiving point depth at the moment k; $\Delta z_k$ is the difference between the receiving point depth at the moment k and the receiving point depth at the moment k+1; and c(z) is the sound velocity profile between the transmission point and the receiving point at the moment k+1.

5. The method for determining an effective sound velocity in the deep sea according to claim 4, wherein the determining an arithmetic average sound velocity at the moment k+1 and a mean square average sound velocity at the moment k+1 according to a depth difference between the receiving point and the transmission point at the moment k+1, the difference between the receiving point depth at the moment k and the receiving point depth at the moment k+1, an arithmetic average sound velocity at the moment k, a mean square average sound velocity at the moment k, the arithmetic average sound velocity variable quantity, and the mean square arithmetic average sound velocity variable quantity comprises:

obtaining a sound velocity profile at the moment k;

determining the arithmetic average sound velocity at the moment k and the mean square average sound velocity at the moment k according to the sound velocity profile c(z) at the moment k, the transmission point depth $z_A$, and the receiving point depth $Z_{B,k}$; and determining the arithmetic average sound velocity at the moment k+1 and the mean square average sound velocity at the moment k+1 according to the depth difference between the receiving point and the transmission point at the moment k+1, the difference between the receiving point depth at the moment k and the receiving point depth at the moment k+1, the arithmetic average sound velocity at the moment k, the mean square average sound velocity at the moment k, the arithmetic average sound velocity variable quantity, and the mean square arithmetic average sound velocity variable quantity by using a formula $$\overline{v}_{k+1} = \frac{1}{z_{ABk} + \Delta z_k} z[ABk]vk + \Delta Vk$$

and a formula $$\overline{w}_{k+1} = \frac{1}{z_{ABk} + \Delta z_k} [z_{ABk}\overline{w}_k + \Delta W_k],$$

wherein $\overline{v}_{k+1}$ is the arithmetic average sound velocity at the moment k+1; $\overline{w}_{k+1}$ is the mean square average sound velocity at the moment k+1; $z_{ABk}$ is the depth difference between the receiving point and the transmission point at the moment k+1; $\overline{v}_k$ is the arithmetic average sound velocity at the moment k; $\overline{w}_k$ is the mean square average sound velocity at the moment k; $\Delta V_k$ is the arithmetic average sound velocity variable quantity; and $\Delta W_k$ is the mean square arithmetic average sound velocity variable quantity.

6. The method for determining an effective sound velocity in the deep sea according to claim 5, wherein the determining an n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1 comprises:

determining the n-order sound velocity function variable quantity (n=2,3,4) according to the sound velocity profile between the transmission point and the receiving point at the moment k+1, the receiving point depth at the moment k, the receiving point depth at the moment k+1, and the arithmetic average sound velocity at the moment k+1 by using a formula $$Q_k = \int_{z_{B,k}}^{z_{B,k+1}} \left( \frac{c(z) - \bar{v}_{k+1}}{\bar{v}_{k+1}} \right)^n dz,$$

wherein $Q_k$ is the n-order sound velocity function variable quantity; $c(z)$ is the sound velocity profile between the transmission point and the receiving point at the moment k+1; $z_{B,k}$ is the receiving point depth at the moment k; $z_{B,k+1}$ is the receiving point depth at the moment k+1; and $\bar{v}_{k+1}$ is the arithmetic average sound velocity at the moment k+1.

7. The method for determining an effective sound velocity in the deep sea according to claim 6, wherein the determining an n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity comprises:

determining the n-order sound velocity function (n=2,3,4) at the moment k+1 according to the n-order sound velocity function variable quantity, the depth difference between the receiving point and the transmission point at the moment k+1, the difference between the receiving point depth at the moment k and the receiving point depth at the moment k+1, the sound velocity profile between the transmission point and the receiving point at the moment k+1, and the arithmetic average sound velocity by using a formula $$J_n^{k+1} = \frac{1}{z_{ABk} + \Delta z_k} \left[ \int_{z_A}^{z_{B,k}} \left( \frac{c(z) - \bar{v}_{k+1}}{\bar{v}_{k+1}} \right)^n dz + Q_k \right],$$

wherein $I_n^{k+1}$ is the n-order sound velocity function corresponding to the n-order sound velocity coefficient at the moment k+1; $Q_k$ is the n-order sound velocity function variable quantity; $z_{ABk}$ is the depth difference between the receiving point and the transmission point at the moment k+1; $\Delta z_k$ is the difference between the receiving point depth at the moment k and the receiving point depth at the moment k+1; $c(z)$ is the sound velocity profile between the transmission point and the receiving point at the moment k+1; and $\bar{v}_{k+1}$ is the arithmetic average sound velocity at the moment k+1.

8. The method for determining an effective sound velocity in the deep sea according to claim 7, wherein the calculating an n-order sound velocity coefficient (n=2,3,4) at the moment k+1 according to a pitch angle at the moment k+1 comprises:

calculating a second-order sound velocity coefficient, a third-order sound velocity coefficient, and a fourth-order sound velocity coefficient according to the pitch angle at the moment k+1 by using formulas: $C_2^{k+1} = 1 - \frac{1}{2}\cot^2\beta_{k+1}$; $C_3^{k+1} = -C_2^{k+1} - 1/2\cot^4\beta_{k+1}$; and $C_4^{k+1} = 1/2\cot^4\beta_{k+1}(3 - 5\cot^2\beta_{k+1}) + C_2^{k+1}, C_4^{k+1} J_4^{k+1})$ wherein $\beta_{k+1}$ is the pitch angle at the moment k+1, and $C_2^{k+1}$, $C_3^{k+1}$, $c_4^{k+1}$ are respectively the second-order sound velocity coefficient, the third-order sound velocity coefficient, and the fourth-order sound velocity coefficient.

9. The method for determining an effective sound velocity in the deep sea according to claim 8, wherein the determining an effective sound velocity at the moment k+1 according to the n-order sound velocity coefficient at the moment k+1, the n-order sound velocity function corresponding to the n-order sound velocity coefficient at the moment k+1, and the arithmetic average sound velocity at the moment k+1 comprises:

determining the effective sound velocity at the moment k+1 according to a formula $v_e^{k+1} = \bar{v}_{k+1}(1 - C_2^{k+1} J_2^{k+1} - C_3^{k+1} J_3^{k+1} - C_4^{k+1} J_4^{k+1})$, wherein $v_e^{k+1}$ is the effective sound velocity at the moment k+1; $\bar{v}_{k+1}$ is the arithmetic average sound velocity at the moment k+1; $J_2^{k+1}, J_3^{k+1}, J_4^{k+1}$ are respectively a second-order sound velocity function, a third-order sound velocity function, and a fourth-order sound velocity function; and $C_2^{k+1}, C_3^{k+1}$, and $C_4^{k+1}$ are respectively the second-order sound velocity coefficient, the third-order sound velocity coefficient, and the fourth-order sound velocity coefficient.

* * * * *

UNITED STATES PATENT AND TRADEMARK OFFICE
CERTIFICATE OF CORRECTION

PATENT NO. : 11,428,569 B2
APPLICATION NO. : 16/654553
DATED : August 30, 2022
INVENTOR(S) : Tongwei Zhang et al.

It is certified that error appears in the above-identified patent and that said Letters Patent is hereby corrected as shown below:

In the Claims

Column 18, Lines 18 through 29 in Claim 8 should be:
calculating a second-order sound velocity coefficient, a third-order sound velocity coefficient, and a fourth-order sound velocity coefficient according to the pitch angle at the moment $k + 1$ by using formulas: $C_2^{k+1} = 1 - \frac{1}{2}\cot^2 \beta_{k+1}$; $C_3^{k+1} = -C_2^{k+1} - \frac{1}{2}\cot^4 \beta_{k+1}$; and $C_4^{k+1} = \frac{1}{8}\cot^4 \beta_{k+1}(3 - 5\cot^2 \beta_{k+1}) + C_2^{k+1}$, wherein $\beta_{k+1}$ is the pitch angle at the moment $k + 1$, and $C_2^{k+1}$, $C_3^{k+1}$, and $C_4^{k+1}$ are respectively the second-order sound velocity coefficient, the third-order sound velocity coefficient, and the fourth-order sound velocity coefficient.

Signed and Sealed this
Twentieth Day of December, 2022

*Katherine Kelly Vidal*
Katherine Kelly Vidal
*Director of the United States Patent and Trademark Office*